(12) United States Patent
Bivens et al.

(10) Patent No.: US 12,361,103 B2
(45) Date of Patent: Jul. 15, 2025

(54) INTEROPERABILITY OF REAL-WORLD AND METAVERSE SYSTEMS

(71) Applicant: Bank of America Corporation, Charlotte, NC (US)

(72) Inventors: Vaughn Maurice Bivens, Clover, SC (US); Manu J. Kurian, Dallas, TX (US); Lalit Dhawan, Cranbury, NJ (US)

(73) Assignee: Bank of America Corporation, Charlotte, NC (US)

( * ) Notice: Subject to any disclaimer, the term of this patent is extended or adjusted under 35 U.S.C. 154(b) by 596 days.

(21) Appl. No.: 17/853,730

(22) Filed: Jun. 29, 2022

(65) Prior Publication Data
US 2024/0004975 A1 Jan. 4, 2024

(51) Int. Cl.
*G06F 21/31* (2013.01)
(52) U.S. Cl.
CPC .................................. *G06F 21/316* (2013.01)
(58) Field of Classification Search
None
See application file for complete search history.

(56) References Cited

U.S. PATENT DOCUMENTS

| | | | |
|---|---|---|---|
| 8,082,297 B2 | 12/2011 | Syvain et al. | |
| 8,631,417 B1 | 1/2014 | Mendes Da Costa et al. | |
| 9,064,128 B1* | 6/2015 | Pelenur ................. | H04L 67/131 |
| 9,165,426 B2 | 10/2015 | Jones et al. | |
| 9,342,211 B2 | 5/2016 | Deluca et al. | |
| 10,326,667 B2 | 6/2019 | Jones et al. | |
| 10,587,584 B2 | 3/2020 | Vikramaratne et al. | |
| 10,610,787 B2 | 4/2020 | Hamilton et al. | |
| 10,931,650 B1 | 2/2021 | Mccown et al. | |
| 10,981,069 B2 | 4/2021 | Kawachiya et al. | |
| 11,170,003 B2 | 11/2021 | Wu et al. | |
| 2007/0254631 A1 | 11/2007 | Spooner | |
| 2010/0250383 A1 | 9/2010 | Frazier et al. | |
| 2010/0262572 A1* | 10/2010 | Cheng ..................... | G06N 5/02 |
| | | | 715/848 |
| 2011/0072367 A1 | 3/2011 | Bauer | |

(Continued)

FOREIGN PATENT DOCUMENTS

| | | |
|---|---|---|
| CN | 101496022 A | 7/2009 |
| CN | 102450032 A | 5/2012 |

(Continued)

*Primary Examiner* — Joseph P Hirl
*Assistant Examiner* — Hassan Saadoun

(57) ABSTRACT

A system includes a user device that can be used by a user to enter a virtual environment and at least one processor coupled to the user device. The processor is configured to record a plurality of real-world data interactions performed by the user and determine a real-world behavior of the user based on the recorded data interactions. The processor receives a request by the user to perform a data interaction in the virtual environment. The processor verifies whether the requested data interaction is in accordance with the recorded real-world behavior of the user. When the requested data interaction is not in accordance with the real-world behavior of the user, the processor verifies the data interaction in the real-world environment and allows the user to perform the data interaction in the virtual environment upon successful verification of the data interaction.

20 Claims, 4 Drawing Sheets

(56) References Cited

U.S. PATENT DOCUMENTS

| | | | |
|---|---|---|---|
| 2013/0346177 A1* | 12/2013 | Jung | G06Q 30/0255 |
| | | | 705/14.1 |
| 2014/0026078 A1 | 1/2014 | Dawson et al. | |
| 2015/0120533 A1* | 4/2015 | Jung | G07F 17/32 |
| | | | 705/35 |
| 2018/0104595 A1 | 4/2018 | Kawachiya et al. | |
| 2018/0123816 A1 | 5/2018 | Tandon et al. | |
| 2019/0180270 A1* | 6/2019 | Ericson | G06Q 20/4014 |
| 2020/0184048 A1* | 6/2020 | Toth | G06F 21/6218 |
| 2020/0338458 A1 | 10/2020 | Huang et al. | |
| 2021/0042748 A1 | 2/2021 | Sepulveda et al. | |
| 2023/0403270 A1* | 12/2023 | Kim | H04L 63/0861 |

FOREIGN PATENT DOCUMENTS

| | | |
|---|---|---|
| CN | 104468741 A | 3/2015 |
| CN | 112446450 A | 3/2021 |
| JP | 2006072952 A | 3/2006 |

* cited by examiner

INTEROPERABILITY OF REAL-WORLD AND METAVERSE SYSTEMS

TECHNICAL FIELD

The present disclosure relates generally to network communication and information security, and more specifically to interoperability of real-world and metaverse systems.

BACKGROUND

In a network environment, user devices are in data communication with other user devices that may be distributed anywhere in the world. These network environments allow data and information to be shared among these devices. Some of the technical challenges that occur when data is exchanged between devices are controlling data leakage, unauthorized access to data, and preventing malicious activities. Data storing user devices, such as computers, laptops, augmented reality devices, virtual reality devices, and smartphones, are vulnerable to attacks. This vulnerability poses several network security challenges. Existing systems are typically unable to detect a malicious attack until after the attack has occurred. For example, a bad actor may pretend to be another user in a virtual environment which then allows the bad actor to gain access to other users' information.

SUMMARY

The system and methods implemented by the system as disclosed in the present disclosure provide technical solutions to the technical problems discussed above by intelligently verifying data interactions performed in a virtual environment. The disclosed system and methods provide several practical applications and technical advantages.

For example, the disclosed systems and methods provide the practical application of intelligently verifying data interactions requested to be performed by a user in a virtual environment by leveraging user information of the user collected in a real-world environment. Embodiments of the present disclosure describe techniques that allow interoperability of real-world systems and virtual world systems (e.g., metaverse systems) so that information may be seamlessly shared between these systems to implement data security including authorization of data interactions and other data interactions performed in real-world and virtual environments. In one example, a server uses information relating to user identity collected during real-world data interactions with the user and stored as part of real-world information, to verify the identity of the user in a virtual environment and/or authorize data interactions performed by the user in the virtual environment. In another example, the server records a real-world behavior of the user based on data interactions performed by the user in the real-world environment. The server then verifies data interactions requested by an avatar of the user in the virtual environment based on the recorded real-world user behavior of the user by determining whether the requested data interaction matches with the real-world behavior of the user. When the requested data interaction fails to match the recorded real-world behavior of the user, the server initiates an additional verification of the requested data interaction in the real-world environment by requesting the user to confirm whether the request was initiated by the user. The seamless data flow between the real-world systems and virtual-world systems allows each system to store less data by avoiding the same data to be stored in both system, as data may stored in one system can be accessed by the other system. Further, verifying data interactions requested by an avatar of the user in the virtual environment based on real-world user behavior of the user leads to greater data security in the virtual environment.

As further described in embodiments of this disclosure, the server may determine a confidence indicator based on an amount of data interactions successfully performed by the user in real-world and/or virtual world environments, wherein a higher amount of successfully completed data interactions translates to a higher confidence indicator. The server may verify a virtual world or real-world data interaction requested by the user based on the confidence indicator of the user. In one or more additional embodiments, The server determines a social approval indicator of a user based on social media interactions of the user across several social media platforms. A higher number of approvals received by the user's social media posts translates to a higher social approval indicator. The server may verify a virtual world or real-world data interaction requested by the user based on the social approval indicator of the user.

Thus, the disclosed system and methods improve data security in the virtual environment as well as in the real-world environment. By improving data security in virtual and real-world environments, the disclosed system and methods generally improve technology related to performing secure data interactions in a virtual environment as well as real-world environment.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Example System

Figure 1:
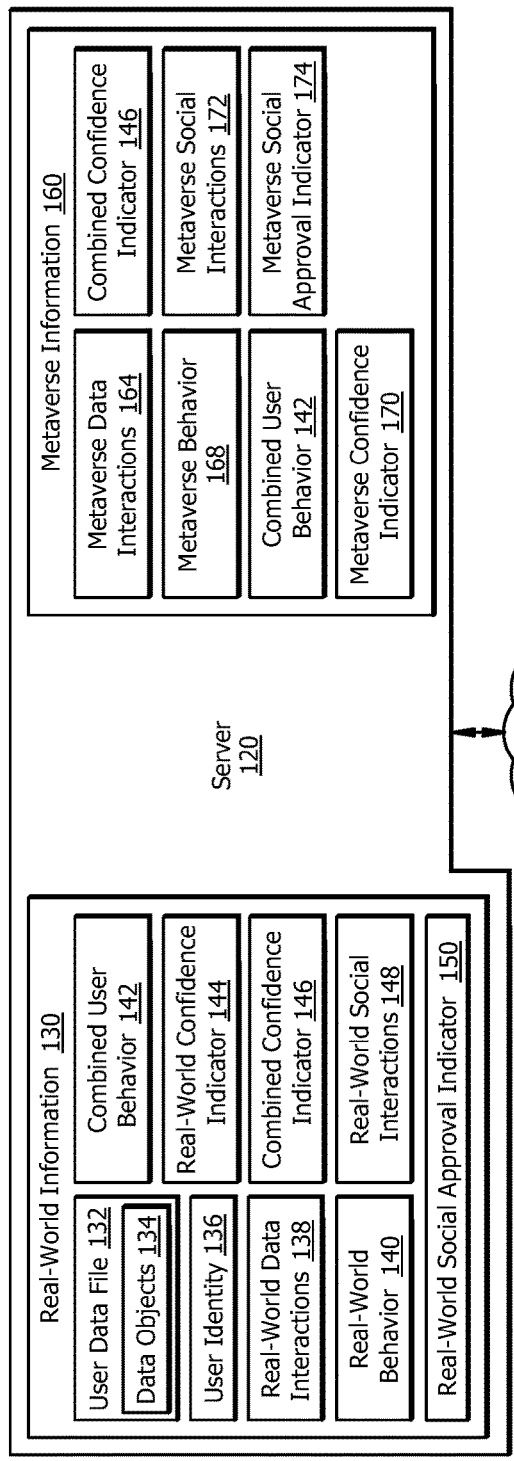
FIG. 1 is a schematic diagram of a system, in accordance with certain aspects of the present disclosure.
Figure 1:
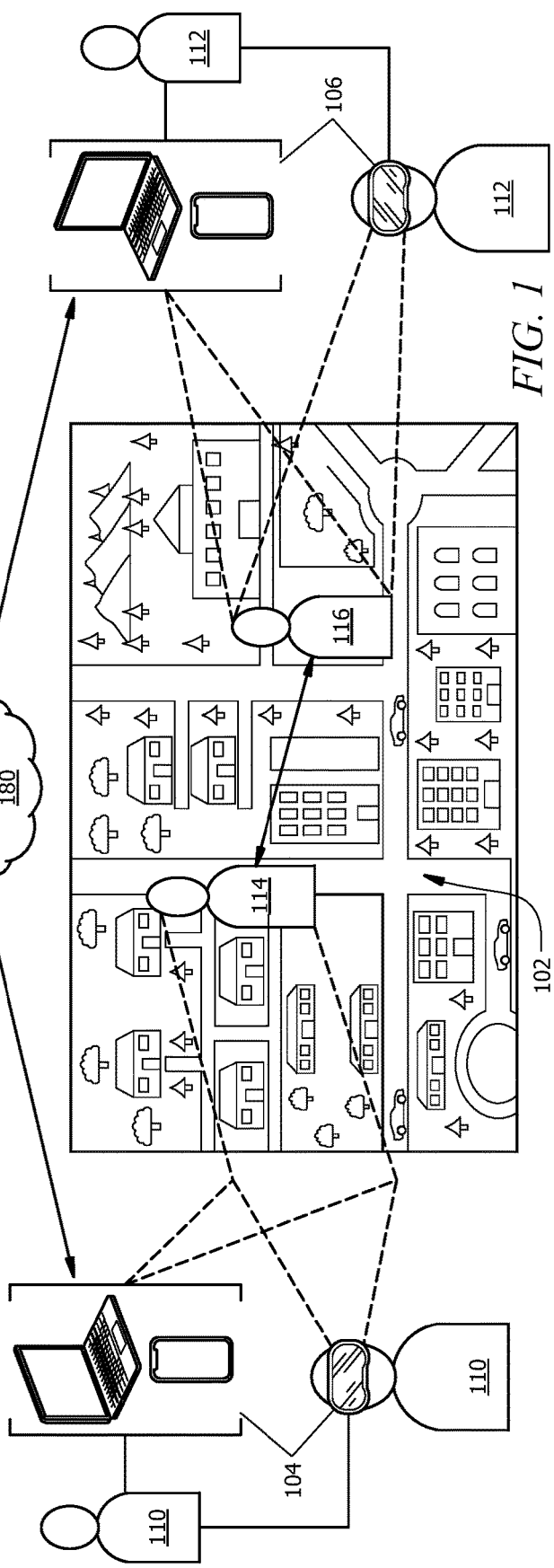

FIG. 1 is a schematic diagram of a system 100, in accordance with certain aspects of the present disclosure. System 100 may include a first user device 104, a second user device 106, and a server 120 each connected to a network 180. A first user 110 is associated with the first user device 104 and a second user 112 is associated with the second user device 106. The system 100 may be communicatively coupled to the communication network 180 and may be operable to transmit data between each one of the first user device 104, second user device 106, and the server 120 through the communication network 180. In general, the system 100 may improve interoperability of real-world systems and virtual world systems (e.g., metaverse systems) so that information may be seamlessly shared between these systems to implement data security, authorization of data interactions and other data interactions performed in real-world and virtual environments. For example, user information collected in a real-world environment may be leveraged in a virtual environment 102 (e.g., metaverse environment) to authenticate the first user 110 before allowing the first user 110 to perform any kind of action or interaction within the virtual environment 102. This process provides improved information security because it relies on a combination of factors that are associated with both the first user 110 in the real-world and a first avatar 114 that is associated with the first user 110 in the virtual environment 102. It may be noted that the terms "real-world" and "real-world environment" in this disclosure refer to any non-virtual environment where users (e.g., users 110 and 112) can physically interact with real persons and objects. A real-world data interaction may refer to any data interaction performed outside the virtual environment 102 (e.g., a metaverse environment). Further, it may be noted that while certain embodiments of the present disclosure are described in the context of a metaverse environment which is an example of a virtual environment 102, the methods discussed in this disclosure apply to any other virtual environment 102. The terms "virtual environment" and "metaverse environment" are used interchangeably throughout this disclosure. Furthermore, it may be noted that while certain embodiments of this disclosure describe one or more operations in relation to the first user 110, these embodiments apply to any user (e.g., second user 112) connected to network 180.

The first user 110 may access the virtual environment 102 (e.g., metaverse environment) through the first user device 104. The first user device 104 is configured to display a two-dimensional (2D) or three-dimensional (3D) representation of the virtual environment 102 to the first user 110. Examples of a virtual environment 102 may include, but are not limited to, a graphical or virtual representation of a metaverse, a map, a building interior, a landscape, a fictional location, an alternate reality, or any other suitable type of location or environment. The virtual environment 102 may be configured to use realistic or non-realistic physics for the motion of objects within the virtual environment 102. For example, some virtual environments 102 may be configured to use gravity whereas other virtual environments 102 may not be configured to use gravity. Within the virtual environment 102, each user may be associated with an avatar (such as the first avatar 114 for the first user 110). An avatar is a graphical representation of a user at a virtual location within the virtual environment 102. In embodiments, the virtual location of the avatar may be correlated to the physical location of a user in the real-world environment. Examples of an avatar may include, but are not limited to, a person, an animal, or an object. In some embodiments, the features and characteristics of the avatar may be customizable and user-defined. For example, the size, shape, color, attire, accessories, or any other suitable type of appearance features may be specified by a user. By using an avatar, a user is able to move within the virtual environment 102 to interact with one or more avatars and objects within the virtual environment 102 while independently remaining at a physical location in the real-world environment or being in transit in the real-world environment.

While engaging in the virtual environment 102 via the first avatar 114, the first user 110 may interact with a plurality of other users through a respective avatar. For example, the second user 112 may attempt to engage in an interaction session with the first avatar 114 through a second avatar 116 associated with the second user 112. In the real-world environment, the second user 112 may be physically located at a distance away from the first user 110. The second user 112 may access the virtual environment 102 through the second user device 106 to control the second avatar 116 and attempt to engage in an interaction session with the first user 110 through the first avatar 114.

Before the interaction between the first avatar 114 and second avatar 116 occurs, the server 120 may authenticate that the first avatar 114 is associated with the first user 110 and not some unauthorized third-party. For example, the first user 110 may be required to sign into a secure portal that provides access to a data file 132 associated with the first user 110, that is stored and managed by the server 120. In one or more embodiments, the server 120 may employ single sign-on (SSO), multifactor authentication, or any other suitable authentication scheme in order to allow the first user 110 access to the data file 132. The data file 132 may include data objects 134 owned by the first user 110. The server 120 may store other information related to the user including, but not limited to, user profile information, account information, avatar information, digital assets (e.g., data objects 134) information, or any other suitable type of information that is associated with a user within the virtual environment 102 and/or the real-world environment.

The server 120 is generally a suitable server (e.g., including a physical server and/or virtual server) operable to store data in a memory and/or provide access to application(s) or other services. The server 120 may be a backend server associated with a particular organization that facilitates conducting interactions between entities and one or more users. In other embodiments, the server 120 may be organized in a distributed manner, or by leveraging cloud computing technologies. As shown in FIG. 1, server 120 may store real-world information 130 which is primarily used to support data interactions performed in the real-world environment, and metaverse information 160 which is primarily used to support data interactions performed in the metaverse environment 102. It may be noted that real-world information 130 and metaverse information 160 may be stored in and managed by separate servers. In this context, the server 120 may have access to the real-world information 130 and the metaverse information 160 stored at respective servers. Details of the operations of the server 120 are described below.

The communication network 180 may facilitate communication within the system 100. This disclosure contemplates the communication network 180 being any suitable network operable to facilitate communication between the first user device 104, second user device 106, and the server 120. Communication network 180 may include any interconnecting system capable of transmitting audio, video, signals, data, messages, or any combination of the preceding. Communication network 180 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication network, a Zigbee network, and/or any other suitable network, operable to facilitate communication between the components of system 100. In other embodiments, system 100 may not have all of these components and/or may have other elements instead of, or in addition to, those above.

Each of the user devices (i.e., first user device 104 and second user device 106) may be any computing device configured to communicate with other devices, such as a server (e.g., server 120), databases, etc. through the communication network 180. Each of the user devices may be configured to perform specific functions described herein and interact with server 120, e.g., via its user interfaces. Each of the user devices is a hardware device that is generally configured to provide hardware and software resources to a user. Examples of a user device include, but are not limited to, a virtual reality device, an augmented reality device, a laptop, a computer, a smartphone, a tablet, a smart device, an Internet-of-Things (IoT) device, or any other suitable type of device. The user devices may comprise a graphical user interface (e.g., a display), a touchscreen, a touchpad, keys, buttons, a mouse, or any other suitable type of hardware that allows a user to view data and/or to provide inputs into the user device. Each user device may be configured to allow a user to send requests to the server 120 or to another user device.

Example User Device

Figure 2:
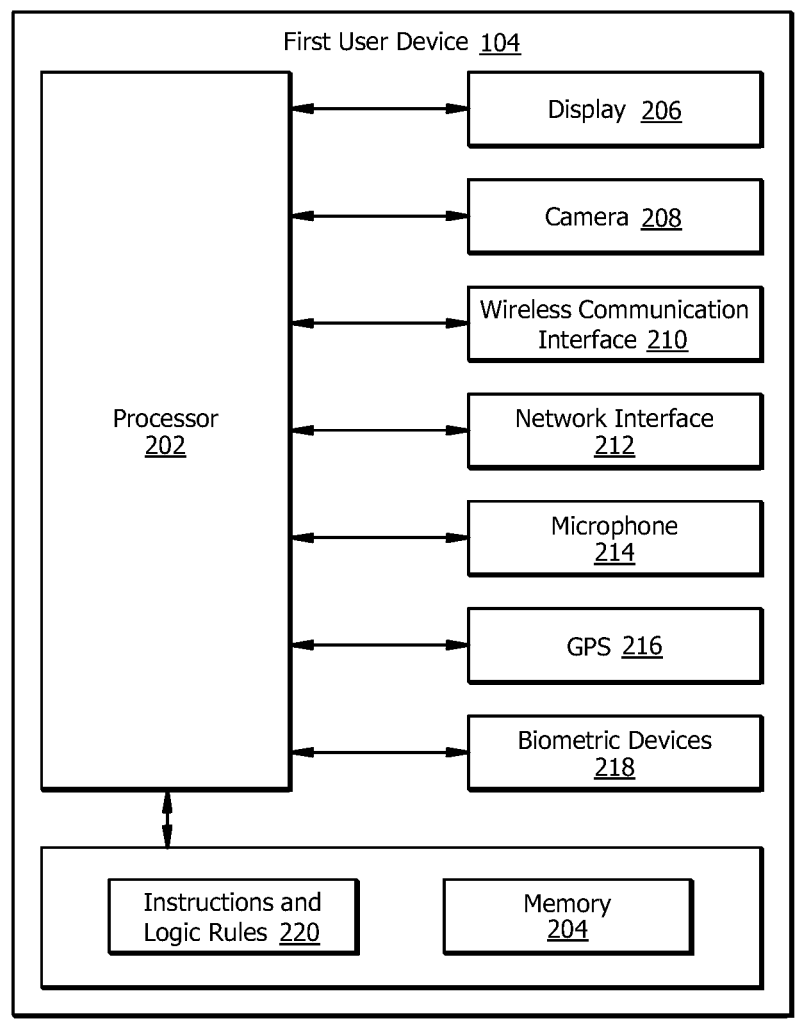
FIG. 2 is a block diagram of an embodiment of the first user device used by the system of FIG. 1.

FIG. 2 is a block diagram of an embodiment of the first user device 104 used by the system of FIG. 1. First user device 104 may be configured to display the virtual environment 102 (referring to FIG. 1) within a field of view of the first user 110 (referring to FIG. 1), capture biometric, sensory, and/or physical information of the first user 110 wearing the first user device 104, and to facilitate an electronic interaction between the first user 110 and the second user 112 (referring to FIG. 1).

First user device 104 comprises a processor 202, a memory 204, and a display 206. Further embodiments may include a camera 208, a wireless communication interface 210, a network interface 212, a microphone 214, a global position system (GPS) sensor 216, and/or one or more biometric devices 218. First user device 104 may be configured as shown or in any other suitable configuration. For example, first user device 104 may comprise one or more additional components and/or one or more shown components may be omitted.

The processor 202 comprises one or more processors operably coupled to and in signal communication with memory 204, display 206, camera 208, wireless communication interface 210, network interface 212, microphone 214, GPS sensor 216, and biometric devices 218. Processor 202 is configured to receive and transmit electrical signals among one or more of memory 204, display 206, camera 208, wireless communication interface 210, network interface 212, microphone 214, GPS sensor 216, and biometric devices 218. The electrical signals are used to send and receive data (e.g., images captured from camera 208, virtual objects to display on display 206, etc.) and/or to control or communicate with other devices. Processor 202 may be operably coupled to one or more other devices (for example, the server 120 in FIG. 1).

The processor 202 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement the function disclosed herein, such as some or all of those described with respect to FIGS. 1 and 3. For example, processor 202 may be configured to display virtual objects on display 206, detect hand gestures, identify virtual objects selected by a detected hand gesture, capture biometric information of a user, such as first user 110, via one or more of camera 208, microphone 214, and/or biometric devices 218, and communicate via wireless communication interface 210 with server 120 and/or second user device 106. In some embodiments, the function described herein is implemented using logic units, FPGAs, ASICs, DSPs, or any other suitable hardware or electronic circuitry.

Figure 3:
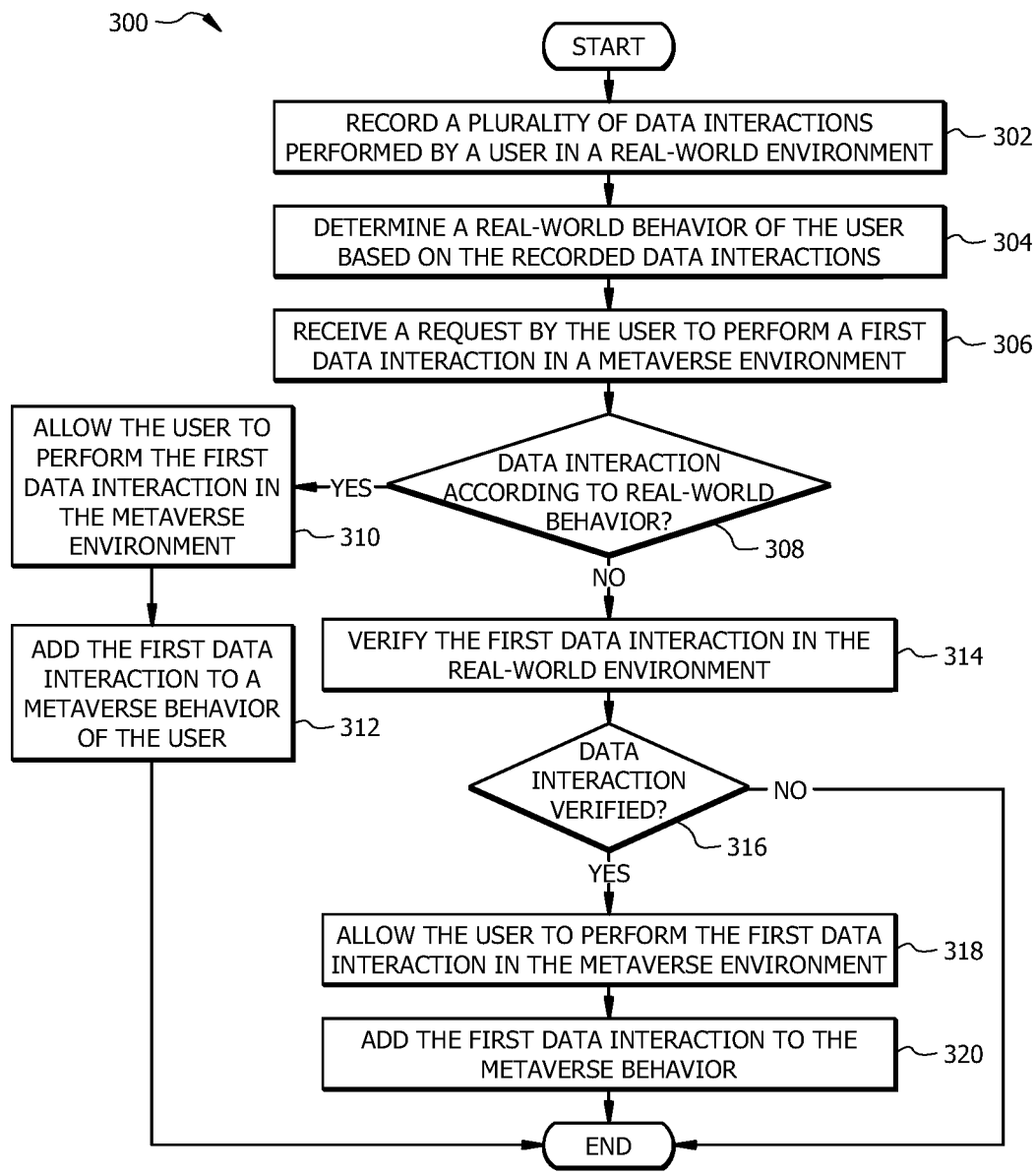
FIG. 3 illustrates a flowchart of an example method for verifying data interactions, in accordance with one or more embodiments of the present disclosure.

The memory 204 is operable to store any of the information described with respect to FIGS. 1 and 3 along with any other data, instructions, logic, rules, or code operable to implement the function(s) described herein when executed by processor 202. For example, the memory 204 may store the instructions 220. The memory 204 comprises one or more disks, tape drives, or solid-state drives, and may be used as an over-flow data storage device, to store programs when such programs are selected for execution, and to store instructions and data that are read during program execution. Memory 204 is operable to store, for example, information relating to the identity of the user (e.g., at least a portion of user identity 136), instructions for performing the functions of first user device 104 described herein, and any other data or instructions. The memory 204 may be volatile or non-volatile and may comprise read-only memory (ROM), random-access memory (RAM), ternary content-addressable memory (TCAM), dynamic random-access memory (DRAM), and static random-access memory (SRAM).

Display 206 is configured to present visual information to a user (for example, first user 110 in FIG. 1) in a virtual reality environment, an augmented reality environment or mixed reality environment. In other embodiments, the display 206 is configured to present visual information to the user as the virtual environment 102 (referring to FIG. 1) in real-time. In an embodiment, display 206 is a wearable optical display (e.g., glasses or a headset) configured to reflect projected images and enables a user to see through the display. For example, display 206 may comprise display units, lens, semi-transparent mirrors embedded in an eye glass structure, a visor structure, or a helmet structure. Examples of display units include, but are not limited to, a cathode ray tube (CRT) display, a liquid crystal display (LCD), a liquid crystal on silicon (LCOS) display, a light emitting diode (LED) display, an active matrix OLED (AMOLED), an organic LED (OLED) display, a projector display, or any other suitable type of display as would be appreciated by one of ordinary skill in the art upon viewing this disclosure. In another embodiment, display 206 is a graphical display on a user device. For example, the graphical display may be the display of a tablet or smart phone configured to display virtual environment 102.

Examples of camera 208 include, but are not limited to, charge-coupled device (CCD) cameras and complementary metal-oxide semiconductor (CMOS) cameras. Camera 208 is configured to capture images of a wearer of first user device 104, such as first user 110. Camera 208 may be configured to capture images continuously, at predetermined intervals, or on-demand. For example, camera 208 may be configured to receive a command from first user 110 to capture an image. In another example, camera 208 is configured to continuously capture images to form a video stream. Camera 208 is communicably coupled to processor 202.

Examples of wireless communication interface 210 include, but are not limited to, a Bluetooth interface, an RFID interface, a near field communication interface, a local area network (LAN) interface, a personal area network interface, a wide area network (WAN) interface, a Wi-Fi interface, a ZigBee interface, or any other suitable wireless communication interface as would be appreciated by one of ordinary skill in the art upon viewing this disclosure. Wireless communication interface 210 is configured to facilitate processor 202 in communicating with other devices. For example, wireless communication interface 210 is configured to enable processor 202 to send and receive signals with other devices, such as second user device 106 (referring to FIG. 1) or server 120 (referring to FIG. 1). Wireless communication interface 210 is configured to employ any suitable communication protocol.

The network interface 212 is configured to enable wired and/or wireless communications. The network interface 212 is configured to communicate data between the first user device 104 and other network devices, systems, or domain (s). For example, the network interface 212 may comprise a WIFI interface, a local area network (LAN) interface, a wide area network (WAN) interface, a modem, a switch, or a router. The processor 202 is configured to send and receive data using the network interface 212. The network interface 212 may be configured to use any suitable type of communication protocol as would be appreciated by one of ordinary skill in the art.

Microphone 214 is configured to capture audio signals (e.g., voice signals or commands) from a user, such as first user 110. Microphone 214 is configured to capture audio signals continuously, at predetermined intervals, or on-demand. Microphone 214 is communicably coupled to processor 202.

GPS sensor 216 is configured to capture and to provide geographical location information. For example, GPS sensor 216 is configured to provide a geographic location of a user, such as first user 110, employing first user device 104. GPS sensor 216 may be configured to provide the geographic location information as a relative geographic location or an absolute geographic location. GPS sensor 216 may provide the geographic location information using geographic coordinates (i.e., longitude and latitude) or any other suitable coordinate system. GPS sensor 216 is communicably coupled to processor 202.

Examples of biometric devices 218 may include, but are not limited to, retina scanners, fingerprint scanners and facial scanners. Biometric devices 218 are configured to capture information about a person's physical characteristics and to output a biometric signal based on captured information. A biometric signal is a signal that is uniquely linked to a person based on their physical characteristics. For example, biometric device 218 may be configured to perform a retinal scan of the user's eye and to generate a biometric signal for the user based on the retinal scan. As another example, a biometric device 218 is configured to perform a fingerprint scan of the user's finger and to generate a biometric signal for the user based on the fingerprint scan. Biometric device 218 is communicably coupled to processor 202.

In one or more embodiments, server 120 and one or more user devices (e.g., second user device 106) may be part of an Information Technology (IT) infrastructure of an organization. For example, second user 112 may be a representative of the organization who may use the second user device 106 to enter the virtual reality environment 102 and virtually interact with one or more users (e.g., first user 110) via the second avatar 116 to provide services to the first user 110.

The server 120 may be configured to allow users (e.g., first user 110) registered with the server 120 to perform one or more data interactions in the real-world environment as well as the metaverse environment 102. As the first user 110 initially registers with the server 120 in the real-world environment, the server 120 may collect several pieces of information from the user including information relating to the identity of the user such as legal name, social security number, biometrics (e.g., fingerprints, retina scans, face ID etc.), residence address, phone numbers, assets owned by the user, and copies of government issued documents (e.g., driver-license, state identity card etc.). This information (shown as user identity 136) is stored by server 120 as part of real-world information 130 of the first user 110. In one embodiment, the user identity 136 may also be stored as part of the metaverse information 160 of the first user 110. Once the identity of the first user 110 is confirmed and all other information provided by the first user 110 is verified to be correct, the server 120 may generate a user data file 132 for the first user 110 in which the first user 110 may store data objects 134 owned by the first user 110. In one example, the first user 110 may engage in a real-world interaction with a service representative managing the server 120 (e.g., physical interaction at an office location, over phone, voice chat etc.) to provide such information that can be used to register the first user 110 at the server 120 and generate the user data file 132 of the first user 110. In another example, the first user 110 may engage in a real-world interaction by accessing a webpage provided and managed by the server 120. Once the first user 110 initiates a registration process via the webpage, the server 120 may walk the first user 110 through several steps in which the first user 110 may be asked to provide information necessary to verify the identity of the first user 110 and register the first user 110 with the server 120.

Once registered with the server 120, the server 120 may allow the first user 110 to perform one or more data interactions. For example, a data interaction may include transferring one or more data objects 134 from user data file 132 of the first user 110 to another data file of a different user (e.g., second user 112). Another example data interaction may include receiving one or more data objects 134 in the user data file 132 of the first user 110 from another data file of a different user (e.g., second user 112). Another example, data interaction may include requesting by the first user 110 transfer of data objects from a user data file of a second user to a user data file of a third user as part of satisfying an agreement between the first user 110 and the third user. It may be noted that a data interaction in accordance with embodiments of the present disclosure refers to any interaction in the real-world environment and/or metaverse environment 102 that includes transfer of data between computing nodes (e.g., first user device 104, second user device 106 and server 120).

In one or more embodiments, a user data file (e.g. user data file 132) of a user (e.g., first user 110) or any other user is a software application running on a computing node owned and/or operated by the user. For example, when the first user 110 desires to receive data objects 134 from the second user 112, first user 110 may direct the second user 112 to a unique cryptographic address (e.g., public key) issued by the user data file 132. In one embodiment, the user data file 132 may not itself store the data objects 134 but may store information that points to a location of the data objects 134, for example, on a server (e.g., server 120). User data file 132 may be web-based or hardware-based. For example, user data file 132 may be stored in a mobile device or a desktop computer connected to the internet. Additionally or alternatively, user data file 132 may be stored in a device (e.g., USB drive) that is not connected to the network 180.

Data security is of utmost importance in any system that supports online data interactions between computing nodes of the system. Online data interactions in real-world environments have existed for several decades and robust measures are already in place to ensure data security in real-world systems. However, metaverse technology is relatively new and data security is a challenge in metaverse systems as the development of metaverse related technologies is still at a nascent stage and standardized systems that provide robust data security are not yet in place.

Embodiments of the present disclosure leverage user data collected in a real-world environment for providing data security in a metaverse environment. In general, embodiments of the present disclosure describe techniques that improve interoperability of real-world systems and virtual world systems (e.g., metaverse systems) so that information may be seamlessly shared between these systems to implement data security, authorization of data interactions and other data interactions performed in real-world and virtual environments.

In one or more embodiments, server 120 may be configured to use information relating to user identity 136 collected during real-world data interactions 138 with the first user 110 and stored as part of real-world information 130, to verify the identity of the first user 110 in the metaverse environment 102 and/or authorize data interactions (e.g., metaverse data interactions 164) performed by the first user 110 in the metaverse environment 102. As described above, based on real-world data interactions 138 with the first user 110, the server 120 may collect several pieces of information related to the first user 110 including, but not limited to, information relating to the identity of the user such as legal name, social security number, biometrics (e.g., fingerprints, retina scans, face ID etc.), residence address, phone numbers, assets owned by the user, and copies of government issued documents (e.g., driver-license, state identity card etc.). This information is stored by server 120 as part of user identity 136, which in turn is stored as part of real-world information 130 of the first user 110.

In one example, when the first user 110 signs on to the metaverse environment 102 as the first avatar 114 and initiates a data interaction (e.g., metaverse data interaction 164) for transferring one or more data objects 134 from the user data file 132, server 120 may access the user identity 136 of the first user 110 stored as part of the real-world information 130 and may use at least a portion of the user identity 136 to verify that the first avatar 114 is associated with the first user 110. For example, a retina scan of the first user 110 may have been previously collected from the first user 110 as part of a real-world data interaction 138 with the first user 110. Information relating to the retina scan may have been stored as part of the user identity 136. When the first user 110 uses the user device 104 (e.g., VR headset) to enter the metaverse environment 102 and initiates a transfer of data objects 134 via first avatar 114, the server 120 obtains a retina scan of the first user 110 using a biometric device (e.g., biometric device 218) provided at the user device 104. The retina scan obtained via the user device is compared with the retina scan of the first user 110 stored as user identity 136 in the real-world information 130. When the two retina scans match, server 120 determines that the first avatar 114 is associated with the first user 110 and may allow the first user 110 to proceed with the requested data transfer.

In one or more embodiments, server 120 may be configured to monitor and record a plurality of real-world data interactions 138 performed by the first user 110 using a user device 104. Information relating to the monitored real-world data interactions 138 may be stored as part of the real-world information 130. The information relating to a real-world data interaction 138 performed by the first user 110 may include, but is not limited to, a type of the real-world data interaction 138, an identity of the user data file 132 of the first user 110 involved in the data interaction, an amount of data objects 134 transferred (e.g., received or sent) as part of the data interaction 138, identity of a user data file sending or receiving data objects as part of the data interaction, and a time of the data interaction.

Server 120 may be configured to determine a real-world behavior 140 of the first user 110 based on the information relating to real-world data interactions 138 collected for the first user over a pre-configured time period. In one embodiment, a real-world behavior 140 of the first user 110 may include a pattern of real-world data interactions 138 performed by the first user 110 including, but not limited to, transfer of data objects 134 from user data file 132 at regular time intervals (e.g., periodically or according to a pre-determined schedule), receipt of data objects 134 into the user data file 132 at regular time intervals (e.g., periodically or according to a pre-determined schedule), amounts of data objects 134 transferred out from the user data file 132, amounts of data objects 134 received in the user data file 132, transfer of data objects to a particular recipient data file, and receipt of data objects into the user data file 132 from a particular sender data file. In one embodiment, any information recorded relating any real-world data interaction 138 performed by the first user 110 may be stored as real-world behavior 140 of the first user 110.

Similarly, server 120 may be configured to monitor and record a plurality of metaverse data interactions 164 performed in the metaverse environment 102 by the first user 110 using a user device 104 (e.g., VR headset). Information relating to the monitored metaverse data interactions 164 may be stored as part of the metaverse information 160. The information relating to a metaverse data interaction 164 performed by the first user 110 may include, but is not limited to, a type of the metaverse data interaction 164, an identity of the user data file 132 of the first user 110 involved in the data interaction, amount of data objects 134 transferred (e.g., received or sent) as part of the data interaction 138, identity of a user data file sending or receiving data objects as part of the data interaction, and a time of the data interaction. It may be noted that the first user 110 may perform a same data interaction in the real-world environment as well as the metaverse environment 102. Thus, the first user 110 may choose to perform the data interaction in the real-world environment or the metaverse environment 102.

Server 120 may be configured to determine a metaverse behavior 168 of the first user 110 based on the information relating to metaverse data interactions 164 collected for the first user 110 over a pre-configured time period. In one embodiment, a metaverse behavior 168 of the first user 110 may include a pattern of metaverse data interactions 164 performed by the first user 110 including, but not limited to, transfer of data objects 134 from user data file 132 at regular time intervals (e.g., periodically or according to a pre-determined schedule), receipt of data objects 134 into the user data file 132 at regular time intervals (e.g., periodically or according to a pre-determined schedule), amounts of data objects 134 transferred out from the user data file 132, amounts of data objects 134 received in the user data file 132, transfer of data objects to a particular recipient data file, and receipt of data objects into the user data file 132 from a particular sender data file. In one embodiment, any information recorded relating any metaverse data interaction 164 performed by the first user 110 may be stored as metaverse behavior 168 of the first user 110.

Server 120 may be configured to verify one or more metaverse data interactions 164 performed by the first user 110 in the metaverse environment 102 based on the real-world behavior 140 of the first user 110 relating to performing real-world data interactions 138. This allows server 120 to leverage information relating to real-world behavior 140 of the first user 110 when there is insufficient metaverse behavior 168 recorded for the first user 110. To verify a metaverse data interaction 164 requested using the first avatar 114 in the metaverse environment 102, server 120 may determine whether the requested metaverse data interaction 164 is in accordance with the real-world behavior 140 of the first user 110 relating to performing real-world data interactions 138. When the requested metaverse data interaction 164 is found to be in accordance with the real-world behavior 140 of the first user 110, server 120 allows the metaverse data interaction 164 to process. For example, the real-world behavior 140 recorded for the first user 110 may include at least one real-world data interaction 138 for transferring data objects 134 from user data file 132 to a second user data file (not shown) of the second user 112. When the server 120 detects a metaverse data interaction 164 initiated by the first avatar 114 requesting transfer of data objects 134 from user data file 132 to the second user data file of the second user 112, server 120 determines that the requested metaverse data interaction 164 is in accordance with the real-world behavior 140 of the first user 110 and authorizes the metaverse data interaction 164. Once the metaverse data interaction 164 is authorized, server 120 may add the metaverse data interaction 164 to the metaverse behavior 168 of the first user 110. In one embodiment, the server 120 may determine that a metaverse data interaction 164 requested by the first user 110 is successfully verified, if there is at least one record (as part of the real-world user behavior 140 of first user 110) of the first user 110 performing a same or similar data interaction in the real-world environment.

However, when the requested metaverse data interaction 164 is found to be not in accordance with the real-world behavior 140 of the first user 110, server 120 may raise an alert and/or verify the metaverse data interaction 164 in the real-world environment. Following the example discussed in the previous paragraph, when based on the real-world behavior 140 of the first user 110, the server 120 determines that the first user has never transferred data objects 134 to the second user data file of the second user 112, server 120 determines that the requested metaverse data interaction 164 is not in accordance with the real-world behavior 140 of the first user 110 and verifies the metaverse data interaction 164 in the real-world environment. For example, to verify the metaverse data interaction 164 in the real-world environment, server 120 may send a notification to a registered first user device 104 of the first user 110, wherein the notification may include information relating to the requested metaverse data interaction 164. Server 120 may allow the metaverse data interaction 164 only after the first user 110 confirms that the requested metaverse data interaction 164 is initiated by the first user 110. For example, the notification sent to the first user device 104 may ask the user to accept or decline the metaverse data interaction 164 (e.g., using respective buttons/links). If the first user 110 accepts the metaverse data interaction 164, server 120 designates the metaverse data interaction 164 as successfully verified and allows the metaverse data interaction 164 to be processed in the metaverse environment 102. In addition, once verified, server 120 may add the metaverse data interaction 164 to the metaverse behavior 168 of the first user 110. On the other hand, when the first user 110 declines the metaverse data interaction 164, server 120 blocks further processing of the metaverse data interaction 164 in the metaverse environment 102. In one embodiment, the server 120 determines that a metaverse data interaction 164 requested by the first user 110 is not in accordance with the real-world behavior 140 of the first user 110, when there is no record (e.g., in the real-world user behavior 140) of a same or similar data interaction performed by the first user 110 in the real-world environment.

In one or more embodiments, a metaverse data interaction 164 requested to be performed in the metaverse environment 102 may be verified based on the real-world behavior 140, metaverse behavior 168 or a combination thereof. For example, if the requested metaverse data interaction 164 is in accordance with any one of the real-world behavior 140 and metaverse behavior 168 (e.g., a similar data interaction has been recorded for the first user 110 in the real-world environment or metaverse environment 102), server 120 may determine that the requested metaverse data interaction 164 is verified and allows the data interaction to process without any additional verification. Similarly a real-world data interaction 138 requested to be performed in the real-world environment may be verified based on the real-world behavior 140, metaverse behavior 168 or a combination thereof.

In one or more embodiments, metaverse behavior 168 of the first user 110 may be used to verify real-world data interactions 138 in the real-world environment. The method for verifying a real-world data interaction 138 based on metaverse behavior 168 of the first user 110 is similar to verifying a metaverse data interaction 164 based on the real-world behavior 140 of the user described above. This allows metaverse behavior 168 recorded for the first user 110 to be leveraged for verifying real-world data interactions 138.

Server 120 may be configured to determine a combined user behavior 142 for the first user 110 based on the real-world behavior 140 and the metaverse behavior 168 recorded for the first user 110. The combined user behavior 142 of the first user 110 may include real-world data interactions 138 performed by the first user 110 in the real-world environment as well as metaverse data interactions 164 performed by the first user 110 in the metaverse environment 102. The server 120 may use the combined user behavior 142 to verify new real-world data interactions 138 requested to be performed in the real-world environment and new metaverse data interactions 164 requested to be performed in the metaverse environment. As shown in FIG. 1, the combined user behavior 142 may be stored as part of real-world information 130 and metaverse information 160. The combined user behavior 142 allows user behavior recorded across the real-world and metaverse environments to be used for verifying data interactions in each of the real-world and metaverse environments.

Server 120 may be configured to determine a metaverse confidence indicator 170 based on metaverse data interactions 164 successfully performed by the first user 110 in the metaverse environment 102. In one embodiment, server 120 may assign a metaverse confidence indicator 170 to the first user 110 based on an amount of metaverse data interactions 164 performed by the first user 110. For example, a higher number of metaverse data interactions 164 successfully performed by the first user 110 results in the first user 110 being assigned a higher metaverse confidence indicator 170. The metaverse confidence indicator 170 of the first user 110 is representative of a level of trust that may be placed on the first user 110 in relation to metaverse data interactions 164 performed by the first user 110 in the metaverse environment 102. Server 120 may be configured to verify a new metaverse data interaction 164 requested to be performed by the first user 110 (e.g., via first avatar 114) in the metaverse environment 102 based on the metaverse confidence indicator of the first user 110. For example, when the first user 110 requests to perform a new metaverse data interaction 164, server 120 may compare the metaverse confidence indicator 170 with a threshold confidence indicator. When the metaverse confidence indicator equals or exceeds the threshold confidence indicator, server 120 determines that the data interaction is verified and allows the requested metaverse data interaction 164 to process.

Server 120 may be configured to determine a real-world confidence indicator 144 based on real-world data interactions 138 successfully performed by the first user 110 in the real-world environment. In one embodiment, server 120 may assign a real-world confidence indicator 144 to the first user 110 based on an amount of real-world data interactions 138 performed by the first user 110. For example, a higher number of real-world data interactions 138 successfully performed by the first user 110 results in the first user 110 being assigned a higher real-world confidence indicator 144. The real-world confidence indicator 144 of the first user 110 is representative of a level of trust that may be placed on the first user 110 in relation to real-world data interactions 138 performed by the first user 110 in the real-world environment. Server 120 may be configured to verify a new real-world data interaction 138 requested to be performed by the first user 110 in the real-world environment based on the real-world confidence indicator 144 of the first user 110. For example, when the first user 110 requests to perform a new real-world data interaction 138, server 120 may compare the real-world confidence indicator 144 with a threshold confidence indicator. When the real-world confidence indicator equals or exceeds the threshold confidence indicator, server 120 determines that the data interaction is verified and allows the requested real-world data interaction 138 to process.

In one or more embodiments, server 120 may be configured to verify a new metaverse data interaction 164 requested by first user 110, based on the real-world confidence indicator 144. Similarly, server 120 may be configured to verify a new real-world data interaction 138 requested by the first user 110, based on the metaverse confidence indicator 170 of the first user 110. For example, when the first user 110 requests to perform a new metaverse data interaction 164, server 120 may compare the real-world confidence indicator 144 of the first user 110 with a threshold confidence indicator. This threshold confidence indicator may be same as the real-world threshold confidence indicator or the metaverse threshold confidence indicator. When the real-world confidence indicator 144 equals or exceeds the threshold confidence indicator, server 120 determines that the data interaction is verified and allows the requested metaverse data interaction 164 to process.

Server 120 may be configured to determine a combined confidence indicator 146 based on the real-world confidence indicator 144 of the first user 110 and the metaverse confidence indicator 170 of the first user 110. For example, the combined confidence indicator 146 may be an average of the real-world confidence indicator 144 and the metaverse confidence indicator 170. In one embodiment, either of the real-world confidence indicator 144 or the metaverse confidence indicator 170 may be assigned a higher weightage when determining the combined confidence indicator 146. This allows either of the real-world confidence indicator 144 or the metaverse confidence indicator 170 having a higher assigned weightage to have a higher influence on the combined confidence indicator 146. The combined confidence indicator 146 may be used to verify newly requested real-world data interactions 138 and/or newly requested metaverse data interactions 164. For example, when the first user 110 requests to perform a new metaverse data interaction 164, server 120 may compare the combined confidence indicator 146 of the first user 110 with a threshold confidence indicator. This threshold confidence indicator may be same as the real-world threshold confidence indicator, the metaverse threshold confidence indicator or another threshold confidence indicator associated with the combined confidence indicator 146. When the combined confidence indicator 146 equals or exceeds the threshold confidence indicator, server 120 determines that the data interaction is verified and allows the requested metaverse data interaction 164 to process. In one embodiment, any one of the real-world confidence indicator 144, the metaverse confidence indicator 170 and the combined confidence indicator 146 may be used to verify one or both of the newly requested real-world data interactions 138 and/or newly requested metaverse data interactions 164.

The idea behind approving data interactions of a user having a high number of previously approved and successful data interactions is that the more data interactions a user has successfully performed the less likely it is that the user will perform a fraudulent or deceptive data interaction in the future. Thus, it is generally safer to approve data interactions of a user having a higher confidence indicator without carrying out additional verifications. In one embodiment, the threshold confidence indicator may be set based on historical data relating to previously detected deceptive data interactions performed by a plurality of users and their respective confidence indicators. For example, the threshold confidence indicator may be set to a number of successfully performed data interactions that has generally not been associated with deceptive data interactions performed by users having that threshold confidence indicator.

Server 120 may be configured to monitor social media interactions of the first user 110 across the real-world environment and/or metaverse environment 102. For example, server 120 may monitor metaverse social interactions 172 of the first user 110 across one or more metaverse social media platforms. Server 120 may be configured to determine a metaverse social approval indicator 174 of the first user 110 based on the metaverse social interactions 172 of the first user 110 recorded for a pre-determined number of social media interactions and/or for a predetermined time period. In one embodiment, the metaverse social interactions 172 may include social media posts made by the first user 110 on one or more metaverse social media platforms. The server 120 may monitor a plurality of social media posts of the first user 110 made on one or more social media platforms and record a number of approvals received for the social media posts. An approval for a social media post may include liking the social media post by another user, a positive comment on the social media post by another user, sharing the social media post by another user, a positive emoji (e.g., smiley face, laughing face, thumbs up etc.) left by another user or any other form of approval shown by other users. Server 120 may record a number of approvals received on a plurality of social media posts made by the first user 110 in the metaverse environment 102 and may determine a metaverse social approval indicator 174 based on the number of approvals associated with the social media posts. In one embodiment, server 120 may assign a higher metaverse social approval indicator 174 to a higher number of recorded social media approvals. Thus, a higher metaverse social approval indicator 174 is indicative of a higher social media approval of the first user 110.

Server 120 may be configured to verify a metaverse data interaction 164 requested by the first user 110 based on the social media approval indicator 174 of the first user. For example, when the first user 110 (e.g. via the first avatar 114) requests to perform a metaverse data interaction 164 in the metaverse environment 102, server 120 compares the metaverse social approval indicator 174 of the first user 110 to a threshold social approval indicator. When the social approval indicator 174 of the first user 110 equals or exceeds the threshold social approval indicator, server 120 determines that the requested metaverse data interaction 164 is verified and allows the metaverse data interaction 164 to process without additional verification. The idea here is that a user having a high social approval indicator is a trusted person in social circles (e.g., across social media platforms) and is unlikely to perform a fraudulent or deceptive data interaction. Thus, a user with a high social approval indicator (e.g., higher than a threshold approval indicator) may be safely approved for newly requested data interactions.

In one or more embodiments, the metaverse social approval indicator 174 of the first user may be used as an additional method of verifying the first user 110, when one or more other methods of verifying the first user 110 are not successful. For example, when the first user 110 (e.g. via the first avatar 114) requests to perform a metaverse data interaction 164 in the metaverse environment 102, server 120 first checks at least one of the metaverse confidence indicator 170, real-world confidence indicator 144 or the combined confidence indicator 146 of the first user 110. When one or more of these confidence indicators are below their respective threshold confidence indicators, server 120 then checks the metaverse social approval indicator 174 of the first user and approves the requested data interaction when the metaverse approval indicator 174 equals or exceeds the social approval threshold score.

Server 120 may monitor real-world social interactions 148 of the first user 110 across one or more real-world social media platforms. Server 120 may be configured to determine a real-world social approval indicator 150 of the first user 110 based on the real-world social interactions 148 of the first user 110 recorded for a pre-determined number of social media interactions and/or a predetermined time period. In one embodiment, the real-world social interactions 148 may include social media posts made by the first user 110 on one or more real-world social media platforms. The server 120 may monitor a plurality of social media posts of the first user 110 made on one or more social media platforms and record a number of approvals received for the social media posts. An approval for a social media post may include liking the social media post by another user, a positive comment on the social media post by another user, sharing the social media post by another user, a positive emoji (e.g., smiley face, laughing face, thumbs up etc.) left by another user or any other form of approval shown by other users. Server 120 may record a number of approvals received on a plurality of social media posts made by the first user 110 in the real-world environment and may determine a real-world social approval indicator 150 based on the number of approvals associated with the social media posts. In one embodiment, server 120 may assign a higher real-world social approval indicator 150 to a higher number of recorded social media approvals. Thus, a higher real-world social approval indicator 150 is indicative of a higher social media approval of the first user 110.

Server 120 may be configured to verify a metaverse data interaction 164 requested by the first user 110 based on the real-world social approval indicator 150 of the first user 110. Similarly, server 120 may be configured to verify a real-world data interaction 138 requested by the first user 110 based on the metaverse social approval indicator 174 of the first user 110. For example, when the first user 110 (e.g. via the first avatar 114) requests to perform a metaverse data interaction 164 in the metaverse environment 102, server 120 compares the real-world social approval indicator 150 of the first user 110 to a threshold social approval indicator. This threshold social approval indicator may be same as or different from the threshold social approval indicator described above in the context of metaverse social approval indicator 174. When the real-world social approval indicator 150 of the first user 110 equals or exceeds the threshold social approval indicator, server 120 determines that the requested metaverse data interaction 164 is verified and allows the metaverse data interaction 164 to process without additional verification.

In an example banking use case, the system and methods disclosed in accordance with embodiments of the present disclosure may help verify financial transactions by a user (e.g., first user 110) in the metaverse environment 102 as well as the real-world environment based on information relating to the user collected based on financial transactions performed by the user in the real-world environment as well as the metaverse environment 102. In this context, the user data file 132 of the first user 110 corresponds to a digital wallet of the first user 110 and the data objects 134 held in the user data file 132 correspond to funds/digital currency owned by the first user 110. The real-world data interactions 138 and metaverse data interactions 164 may include financial transactions performed by the first user 110 in the respective environments. These transactions may include transferring funds from the digital wallet of the first user 110 to a second digital wallet of the second user 112, receiving funds into the digital wallet of the first user 110, initiating a request for loan, and any other transaction that includes transfer of a financial instrument. In one embodiment, the user identity 136, real-world behavior 140, metaverse behavior 168, combined user behavior 142, real-world confidence indicator 144, metaverse confidence indicator 170, combined confidence indicator 146, real-world social approval indicator 150 and metaverse social approval indicator 174 may be part of Know Your Customer (KYC) information collected for the first user. Any one or more of these KYC information collected for the first user 110 may be used to verify the identity of the first user 110 and/or verify a data interaction performed by the first user 110 in the real-world environment or the metaverse environment 102 as described above.

FIG. 3 illustrates a flowchart of an example method 300 for verifying data interactions, in accordance with one or more embodiments of the present disclosure. Method 300 may be performed by the server 120 shown in FIG. 1.

At operation 302, server 120 records a plurality of data interactions (e.g., real-world data interactions 138) performed by the user (e.g., first user 110) in a real-world environment. As described above, server 120 may be configured to monitor and record a plurality of real-world data interactions 138 performed by the first user 110 using a user device 104. Information relating to the monitored real-world data interactions 138 may be stored as part of the real-world information 130. The information relating to a real-world data interaction 138 performed by the first user 110 may include, but is not limited to, a type of the real-world data interaction 138, an identity of the user data file 132 of the first user 110 involved in the data interaction, an amount of data objects 134 transferred (e.g., received or sent) as part of the data interaction 138, identity of a user data file sending or receiving data objects as part of the data interaction, and a time of the data interaction.

At operation 304, server 120 determines a real-world behavior 140 of the user based on the recorded data. As described above, server 120 may be configured to determine a real-world behavior 140 of the first user 110 based on the information relating to real-world data interactions 138 collected for the first user over a pre-configured time period. In one embodiment, a real-world behavior 140 of the first user 110 may include a pattern of real-world data interactions 138 performed by the first user 110 including, but not limited to, transfer of data objects 134 from user data file 132 at regular time intervals (e.g., periodically or according to a pre-determined schedule), receipt of data objects 134 into the user data file 132 at regular time intervals (e.g., periodically or according to a pre-determined schedule), amounts of data objects 134 transferred out from the user data file 132, amounts of data objects 134 received in the user data file 132, transfer of data objects to a particular recipient data file, and receipt of data objects into the user data file 132 from a particular sender data file. In one embodiment, any information recorded relating any real-world data interaction 138 performed by the first user 110 may be stored as real-world behavior 140 of the first user 110.

At operation 306, server 120 receives a request by the user to perform a first data interaction (e.g., metaverse data interaction 164) in the virtual environment 102.

At operation 308, server 120 determines whether the first data interaction requested to be performed in the virtual environment 102 is in accordance with a log of the real-world behavior of the user. The log of the real-world behavior may refer to the stored information relating to the real-world behavior 140 of the user.

As described above, server 120 may be configured to verify one or more metaverse data interactions 164 performed by the first user 110 in the metaverse environment 102 based on the real-world behavior 140 of the first user 110 relating to performing real-world data interactions 138. This allows server 120 to leverage information relating to real-world behavior 140 of the first user 110 when there is insufficient metaverse behavior 168 recorded for the first user 110. To verify a metaverse data interaction 164 requested using the first avatar 114 in the metaverse environment 102, server 120 may determine whether the requested metaverse data interaction 164 is in accordance with the real-world behavior 140 of the first user 110 relating to performing real-world data interactions 138.

When the requested first data interaction is found to be in accordance with the log of the real-world behavior 140 of the user, method 300 proceeds to operation 310 where server 120 allows the user to perform the first data interaction in the metaverse environment 102. As described above, when the requested metaverse data interaction 164 is found to be in accordance with the real-world behavior 140 of the first user 110, server 120 allows the metaverse data interaction 164 to process. For example, the real-world behavior 140 recorded for the first user 110 may include at least one real-world data interaction 138 for transferring data objects 134 from user data file 132 to a second user data file (not shown) of the second user 112. When the server 120 detects a metaverse data interaction 164 initiated by the first avatar 114 requesting transfer of data objects 134 from user data file 132 to the second user data file of the second user 112, server 120 determines that the requested metaverse data interaction 164 is in accordance with the real-world behavior 140 of the first user 110 and authorizes the metaverse data interaction 164. In one embodiment, the server 120 may determine that a metaverse data interaction 164 requested by the first user 110 is successfully verified, if there is at least one record (as part of the real-world user behavior 140 of first user 110) of the first user 110 performing a same or similar data interaction in the real-world environment.

At operation 312, server 120 adds the first data interaction to a virtual-world behavior (e.g., metaverse behavior 168) of the user. As described above, once the metaverse data interaction 164 is authorized, server 120 may add the metaverse data interaction 164 to the metaverse behavior 168 of the first user 110.

When the requested first data interaction is found to be not in accordance with the log of the real-world behavior 140 of the user, method 300 proceeds to operation 314, where server 120 verifies the first data interaction in the real-world environment. As described above, when the requested metaverse data interaction 164 is found to be not in accordance with the real-world behavior 140 of the first user 110, server 120 may raise an alert and/or verify the metaverse data interaction 164 in the real-world environment. Following the example discussed in the previous paragraphs, when based on the real-world behavior 140 of the first user 110, the server 120 determines that the first user has never transferred data objects 134 to the second user data file of the second user 112, server 120 determines that the requested metaverse data interaction 164 is not in accordance with the real-world behavior 140 of the first user 110 and verifies the metaverse data interaction 164 in the real-world environment. For example, to verify the metaverse data interaction 164 in the real-world environment, server 120 may send a notification to a registered first user device 104 of the first user 110, wherein the notification may include information relating to the requested metaverse data interaction 164. Server 120 may allow the metaverse data interaction 164 only after the first user 110 confirms that the requested metaverse data interaction 164 is initiated by the first user 110. For example, the notification sent to the first user device 104 may ask the user to accept or decline the metaverse data interaction 164 (e.g., using respective buttons/links). If the first user 110 accepts the metaverse data interaction 164, server 120 designates the metaverse data interaction 164 as successfully verified and allows the metaverse data interaction 164 to be processed in the metaverse environment 102. In addition, once verified, server 120 may add the metaverse data interaction 164 to the metaverse behavior 168 of the first user 110. On the other hand, when the first user 110 declines the metaverse data interaction 164, server 120 blocks further processing of the metaverse data interaction 164 in the metaverse environment 102. In one embodiment, the server 120 determines that a metaverse data interaction 164 requested by the first user 110 is not in accordance with the real-world behavior 140 of the first user 110, when there is no record (e.g., in the real-world user behavior 140) of a same or similar data interaction performed by the first user 110 in the real-world environment.

At operation 316, server 120 determines whether the first data interaction was successfully verified in the real-world environment. When the first data interaction is successfully verified, method 300 proceeds to operation 318, where server 120 allows the user to perform the first data interaction in the virtual environment.

At operation 320, server 120 adds the first data interaction to the virtual-world behavior of the user.

When, at operation 316, server 120 is unable to successfully verify the first data interaction in the real-world environment, the request from the user to perform the first data interaction is discarded and method 300 ends here. For example, if the user denies initiating the request for the first data interaction, server 120 determines that the first data interaction is not verified.

Figure 4:
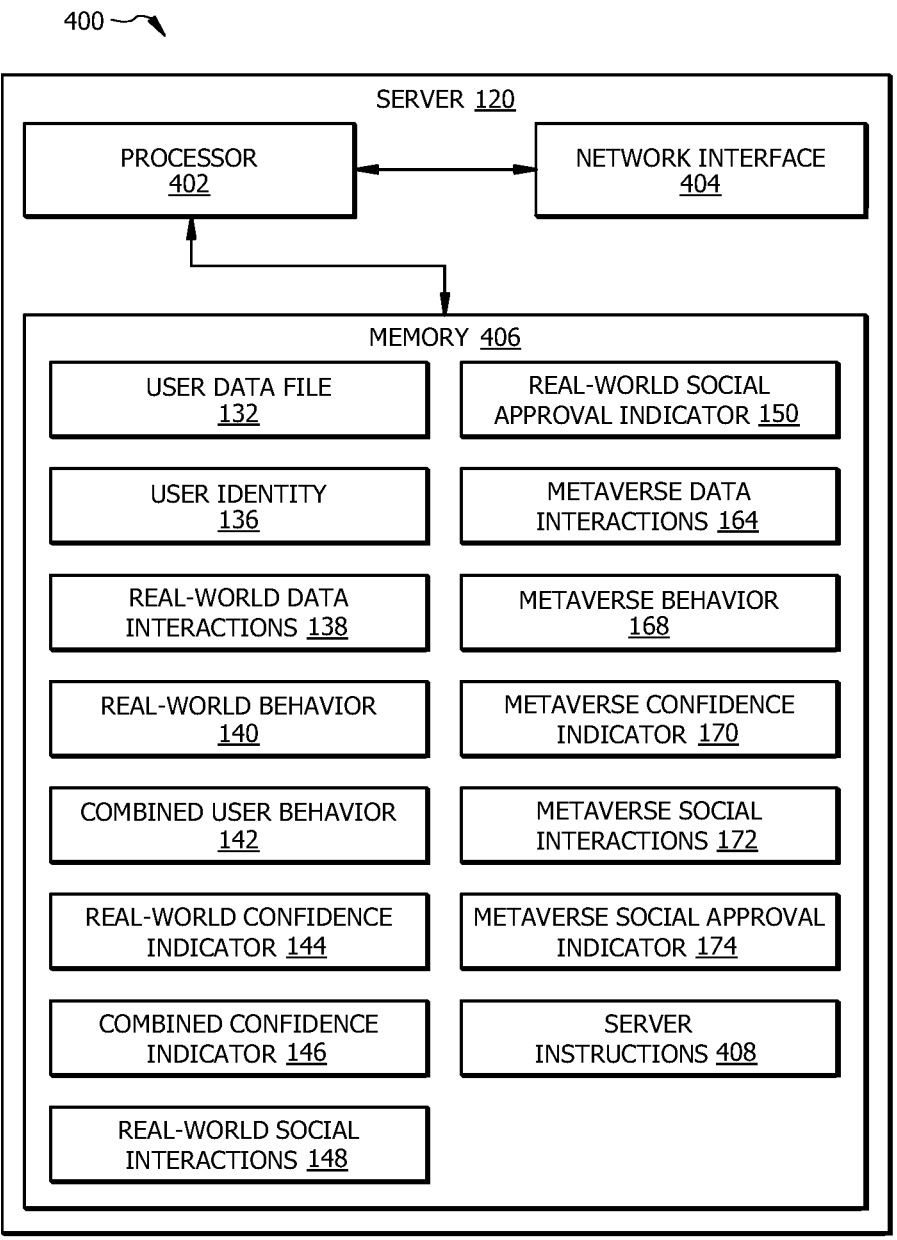
FIG. 4 illustrates an example schematic diagram of the server shown in FIG. 1, in accordance with one or more aspects of the present disclosure.

FIG. 4 illustrates an example schematic diagram 400 of the server 120 shown in FIG. 1, in accordance with one or more aspects of the present disclosure.

The server 120 comprises a processor 402, a memory 406, and a network interface 404. The server 120 may be configured as shown in FIG. 4 or in any other suitable configuration.

The processor 402 comprises one or more processors operably coupled to the memory 406. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 406. The one or more processors are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., server instructions 408) to implement the server 120. In this way, processor 402 may be a special-purpose computer designed to implement the functions disclosed herein. In one or more embodiments, the server 120 is implemented using logic units, FPGAs, ASICs, DSPs, or any other suitable hardware. The server 120 is configured to operate as described with reference to FIG. 3. For example, the processor 402 may be configured to perform at least a portion of the method 300 as described in FIG. 3.

The memory 406 comprises one or more disks, tape drives, or solid-state drives, and may be used as an over-flow data storage device, to store programs when such programs are selected for execution, and to store instructions and data that are read during program execution. The memory 406 may be volatile or non-volatile and may comprise a read-only memory (ROM), random-access memory (RAM), ternary content-addressable memory (TCAM), dynamic random-access memory (DRAM), and static random-access memory (SRAM).

The memory 406 is operable to store the user data file 132, user identity 136, real-world data interactions 138, log of the real-world behavior 140, log of the combined user behavior 142, real-world confidence indicator 144, combined confidence indicator 146, real-world social interactions 148, real-world social approval indicator 150, metaverse data interactions 164, log of the metaverse behavior 168, metaverse confidence indicator 170, metaverse social interactions 172, metaverse social approval indicator 174 and the server instructions 408. The server instructions 408 may include any suitable set of instructions, logic, rules, or code operable to execute the server 120.

The network interface 404 is configured to enable wired and/or wireless communications. The network interface 404 is configured to communicate data between the server 120 and other devices, systems, or domains (e.g. user devices 104 and 106). For example, the network interface 404 may comprise a Wi-Fi interface, a LAN interface, a WAN interface, a modem, a switch, or a router. The processor 402 is configured to send and receive data using the network interface 404. The network interface 404 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
   a memory that stores a log of data interactions and real-world behavior associated with a user; and at least one processor coupled to the memory and configured to:
record a plurality of data interactions performed by the user in a real-world environment;
determine a real-world behavior of the user based on the recorded data interactions;
receive a request by the user to perform a first data interaction in a virtual environment;
determine whether the first data interaction requested to be performed in the virtual environment is in accordance with a log of the real-world behavior of the user, comprising determining whether the first data interaction relates to at least one data interaction previously performed by the user in the real-world environment;
when the first data interaction is in accordance with the real-world behavior of the user:
allow the user to perform the first data interaction in the virtual environment; and
add the first data interaction to a virtual-world behavior of the user, wherein the virtual-world behavior of the user is based on one or more data interactions performed by the user in the virtual environment; and
when the first data interaction is not in accordance with the real-world behavior of the user:
verify the first data interaction in the real-world environment;
when the first data interaction is successfully verified, allow the user to perform the first data interaction in the virtual environment; and
add the first data interaction to the virtual-world behavior of the user.

2. The system of claim 1, wherein the at least one processor is further configured to:
record a plurality of data interactions performed by the user in the virtual environment; and
determine the virtual-world behavior of the user based on the recorded data interactions of the user performed in the virtual environment.

3. The system of claim 1, wherein the processor is further configured to:
combine the real-world behavior and the virtual-world behavior of the user to generate a combined user behavior; and
verify, based on the combined user behavior, a second data interaction performed in at least one of the real-world environment and the virtual environment.

4. The system of claim 1, wherein the processor is further configured to:
receive a request by the user to perform a second data interaction in the real-world environment; and
verify the second data interaction based on the virtual-world behavior of the user.

5. The system of claim 1, wherein the processor is further configured to:
determine a virtual-world confidence indicator of the user based on data interactions performed by the user in the virtual environment, wherein a higher amount of data interactions performed by the user in the virtual environment translates to a higher virtual-world confidence indicator;
determine a real-world confidence indicator of the user based on data interactions performed by the user in the real-world environment, wherein a higher amount of data interactions performed by the user in the real-world environment translates to a higher real-world confidence indicator; and
determine a combined confidence indicator of the user based on the virtual-world confidence indicator and the real-world confidence indicator.

6. The system of claim 5, wherein the processor is configured to verify the first data interaction by:
determining whether one or more of the virtual-world confidence indicator, the real-world confidence indicator and the combined confidence indicator of the user equals or exceeds a threshold confidence indicator; and
when one or more of the virtual-world confidence indicator, the real-world confidence indicator and the combined confidence indicator of the user equals or exceeds a threshold confidence indicator, determining that the first data interaction is successfully verified.

7. The system of claim 5, wherein the processor is further configured to:
monitor a plurality of media interactions of the user in one or more social networking platforms in the virtual environment;
record a number of approvals associated with the media interactions; and
determine a social approval indicator of the user based on the number of approvals, wherein a higher number of approvals corresponds to a higher social approval indicator of the user.

8. The system of claim 7, wherein the processor is configured to verify the first data interaction by:
determining that one or more of the virtual-world confidence indicator, the real-world confidence indicator and the combined confidence indicator of the user is lower than a threshold confidence indicator;
determining that the social approval indicator of the user equals or exceeds a threshold social approval indicator; and
in response to determining that the social approval indicator of the user equals or exceeds the threshold social approval indicator, determining that the first data interaction is successfully verified.

9. A method for verifying data interactions, comprising:
recording a plurality of data interactions performed by a user in a real-world environment;
determining a real-world behavior of the user based on the recorded data interactions;
receiving a request by the user to perform a first data interaction in a virtual environment;
determining whether the first data interaction requested to be performed in the virtual environment is in accordance with a log of the real-world behavior of the user, comprising determining whether the first data interaction relates to at least one data interaction previously performed by the user in the real-world environment;
when the first data interaction is in accordance with the real-world behavior of the user:
allowing the user to perform the first data interaction in the virtual environment; and
adding the first data interaction to a virtual-world behavior of the user, wherein the virtual-world behavior of the user is based on one or more data interactions performed by the user in the virtual environment; and
when the first data interaction is not in accordance with the real-world behavior of the user:
verifying the first data interaction in the real-world environment;

when the first data interaction is successfully verified, allowing the user to perform the first data interaction in the virtual environment; and adding the first data interaction to the virtual-world behavior of the user.

10. The method of claim 9, further comprising:

recording a plurality of data interactions performed by the user in the virtual environment; and determining the virtual-world behavior of the user based on the recorded data interactions of the user performed in the virtual environment.

11. The method of claim 9, further comprising:

combining the real-world behavior and the virtual-world behavior of the user to generate a combined user behavior; and verifying, based on the combined user behavior, a second data interaction performed in at least one of the real-world environment and the virtual environment.

12. The method of claim 9, further comprising:

receiving a request by the user to perform a second data interaction in the real-world environment; and verifying the second data interaction based on the virtual-world behavior of the user.

13. The method of claim 9, further comprising:

determining a virtual-world confidence indicator of the user based on data interactions performed by the user in the virtual environment, wherein a higher amount of data interactions performed by the user in the virtual environment translates to a higher virtual-world confidence indicator;

determining a real-world confidence indicator of the user based on data interactions performed by the user in the real-world environment, wherein a higher amount of data interactions performed by the user in the real-world environment translates to a higher real-world confidence indicator; and determining a combined confidence indicator of the user based on the virtual-world confidence indicator and the real-world confidence indicator.

14. The method of claim 13, wherein verifying the first data interaction comprises:

determining whether one or more of the virtual-world confidence indicator, the real-world confidence indicator and the combined confidence indicator of the user equals or exceeds a threshold confidence indicator; and when one or more of the virtual-world confidence indicator, the real-world confidence indicator and the combined confidence indicator of the user equals or exceeds a threshold confidence indicator, determining that the first data interaction is successfully verified.

15. The method of claim 13, further comprising:

monitoring a plurality of social media interactions of the user in one or more social networking platforms in the virtual environment;

recording a number of approvals associated with the social media interactions; and determining a social approval indicator of the user based on the number of approvals, wherein a higher number of approvals corresponds to a higher social approval indicator of the user.

16. The method of claim 15, wherein verifying the first data interaction comprises:

determining that one or more of the virtual-world confidence indicator, the real-world confidence indicator and the combined confidence indicator of the user is lower than a threshold confidence indicator;

determining that the social approval indicator of the user equals or exceeds a threshold social approval indicator; and in response to determining that the social approval indicator of the user equals or exceeds the threshold social approval indicator, determining that the first data interaction is successfully verified.

17. A computer-readable medium for verifying data interactions, wherein the computer-readable medium stores instructions which when executed by a processor causes the processor to:

record a plurality of data interactions performed by a user in a real-world environment;

determine a real-world behavior of the user based on the recorded data interactions;

receive a request by the user to perform a first data interaction in a virtual environment;

determine whether the first data interaction requested to be performed in the virtual environment is in accordance with a log of the real-world behavior of the user, comprising determining whether the first data interaction relates to at least one data interaction previously performed by the user in the real-world environment;

when the first data interaction is in accordance with the real-world behavior of the user:
  allow the user to perform the first data interaction in the virtual environment; and
  add the first data interaction to a virtual-world behavior of the user, wherein the virtual-world behavior of the user is based on one or more data interactions performed by the user in the virtual environment; and when the first data interaction is not in accordance with the real-world behavior of the user:
  verify the first data interaction in the real-world environment;
  when the first data interaction is successfully verified, allow the user to perform the first data interaction in the virtual environment; and
  add the first data interaction to the virtual-world behavior of the user.

18. The computer-readable medium of claim 17, wherein the instructions further cause the processor to:

record a plurality of data interactions performed by the user in the virtual environment; and determine the virtual-world behavior of the user based on the recorded data interactions of the user performed in the virtual environment.

19. The computer-readable medium of claim 17, wherein the instructions further cause the processor to:

combine the real-world behavior and the virtual-world behavior of the user to generate a combined user behavior; and verify, based on the combined user behavior, a second data interaction performed in at least one of the real-world environment and the virtual environment.

20. The computer-readable medium of claim 17, wherein the instructions further cause the processor to:

receive a request by the user to perform a second data interaction in the real-world environment; and verify the second data interaction based on the virtual-world behavior of the user.

* * * * *